US009715357B2

(12) United States Patent
Cho et al.

(10) Patent No.: US 9,715,357 B2
(45) Date of Patent: Jul. 25, 2017

(54) TEMPORARY AUTHENTICATION METHOD IN CASE OF FAILURE IN AUTHENTICATION USING EXTERNAL AUTHENTICATION SERVER AND IMAGE FORMING APPARATUS PERFORMING THE SAME

(71) Applicant: SAMSUNG ELECTRONICS CO., LTD., Suwon-si, Gyeonggi-do (KR)

(72) Inventors: Tae-gyun Cho, Hwaseong-si (KR); Hyun-cheol Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/598,782

(22) Filed: Jan. 16, 2015

(65) Prior Publication Data
US 2015/0199155 A1 Jul. 16, 2015

(30) Foreign Application Priority Data

Jan. 16, 2014 (KR) ........................ 10-2014-0005602

(51) Int. Cl.
*G06F 15/00* (2006.01)
*G06F 3/12* (2006.01)

(52) U.S. Cl.
CPC ............ *G06F 3/1222* (2013.01); *G06F 3/121* (2013.01); *G06F 3/1234* (2013.01); *G06F 3/1238* (2013.01); *G06F 3/1285* (2013.01)

(58) Field of Classification Search
CPC .................................................. G06F 3/1238

USPC ........................................................ 358/1.14
See application file for complete search history.

(56) References Cited

U.S. PATENT DOCUMENTS

| 2007/0283157 | A1* | 12/2007 | Yami ..................... H04L 9/0844 713/175 |
| 2008/0113653 | A1 | 5/2008 | Brass et al. |
| 2010/0027046 | A1 | 2/2010 | Maeda |
| 2011/0093921 | A1* | 4/2011 | Tsujimoto .............. G03G 21/02 726/3 |
| 2011/0107396 | A1 | 5/2011 | Ozaki |
| 2011/0188082 | A1 | 8/2011 | Moyer et al. |
| 2014/0063534 | A1* | 3/2014 | Kawai .................. G06F 3/1222 358/1.14 |

FOREIGN PATENT DOCUMENTS

| JP | 2010-66798 | 3/2010 |
| JP | 2012-115992 | 6/2012 |

\* cited by examiner

*Primary Examiner* — Saeid Ebrahimi Dehkordy
(74) *Attorney, Agent, or Firm* — Staas & Halsey LLP

(57) ABSTRACT

A method of performing user authentication in an image forming apparatus, the method including detecting whether an interruption or a failure has occurred during authentication using an external authentication server; providing a user interface (UI) screen image for selecting to retry the authentication using the external authentication server or to enter a temporary authentication mode that does not use the external authentication server; when it is selected to enter the temporary authentication mode, entering an administrator authentication mode or an internal authentication mode based on pre-set temporary authentication options; and receiving information necessary for authentication and performing authentication based on a current authentication mode.

17 Claims, 12 Drawing Sheets

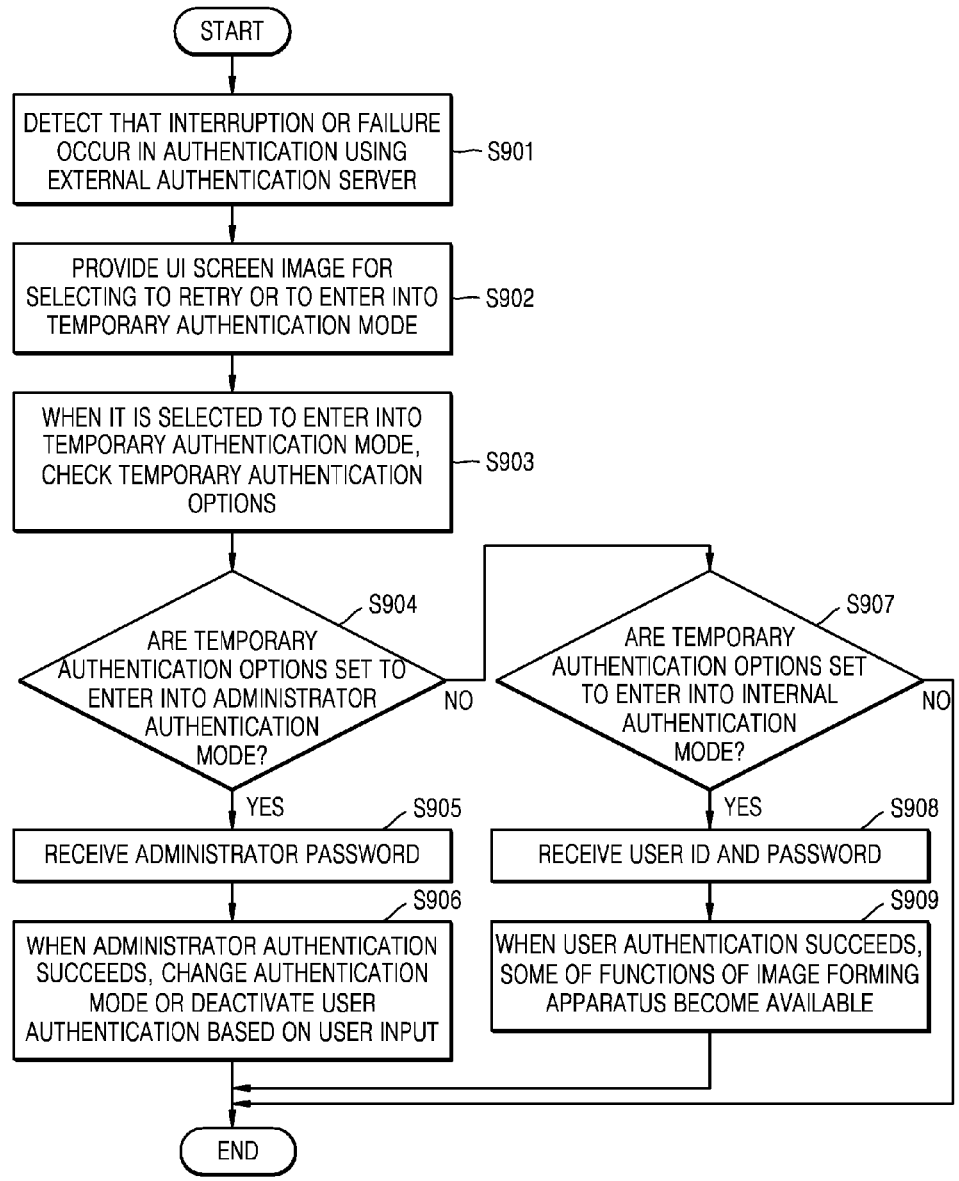

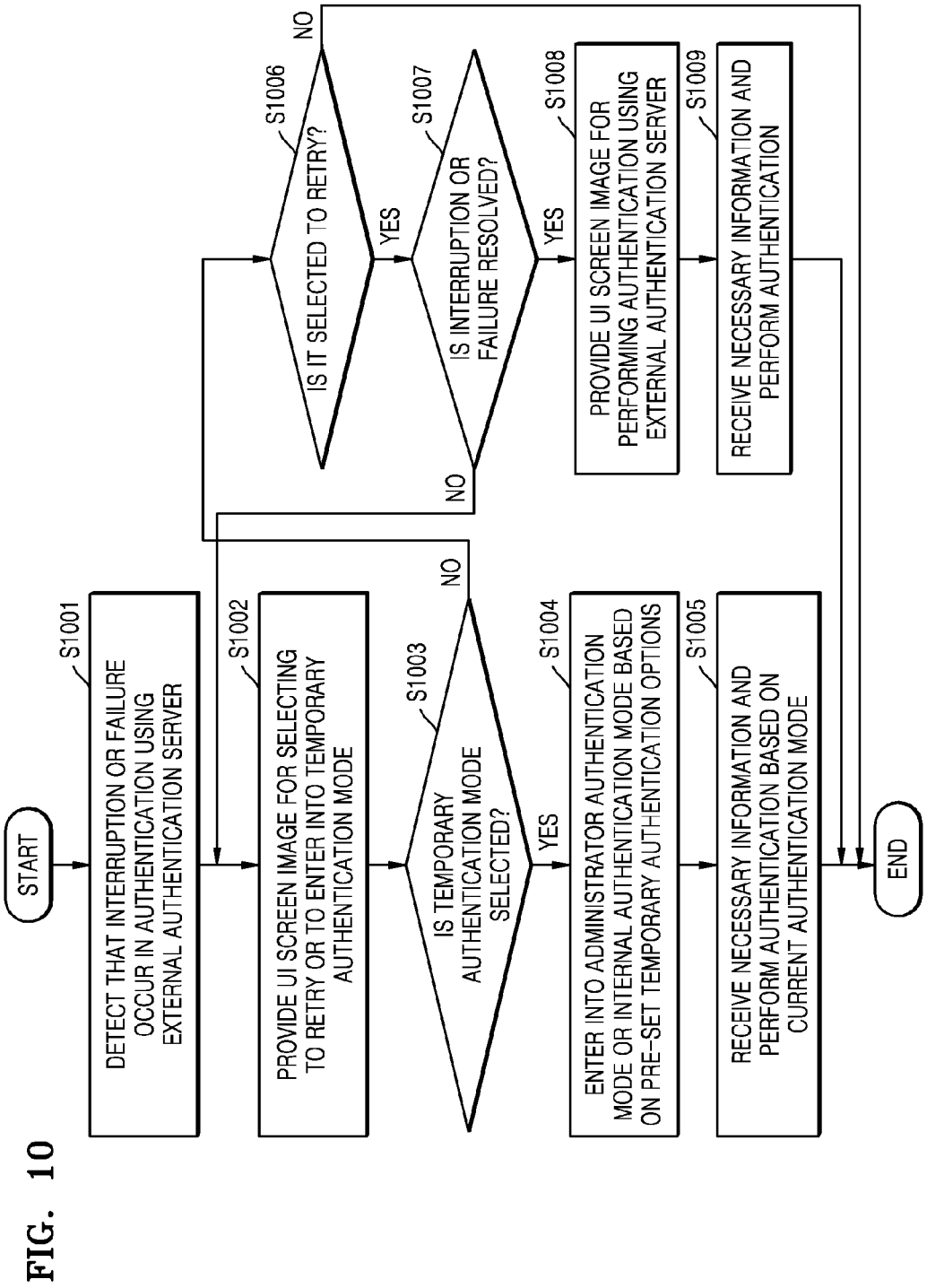

TEMPORARY AUTHENTICATION METHOD IN CASE OF FAILURE IN AUTHENTICATION USING EXTERNAL AUTHENTICATION SERVER AND IMAGE FORMING APPARATUS PERFORMING THE SAME

CROSS-REFERENCE TO RELATED APPLICATIONS

This application claims the benefit of Korean Patent Application No. 10-2014-0005602, filed on Jan. 16, 2014, in the Korean Intellectual Property Office, the disclosure of which is incorporated herein in its entirety by reference.

BACKGROUND

1. Field

Example embodiments of the following disclosure relate to a temporary authentication method in the case of a failure in authentication using an external authentication server at an image forming apparatus, such as a printer or a multifunction printer, and an image forming apparatus for performing the same.

2. Description of the Related Art

Due to recently increased security needs, user authentication is often required in order to use office devices, such as a multifunction printer. A user authentication may be performed in any of various ways. Generally, user authentication is performed by comparing authentication information input by a user to authentication information stored in a database arranged in a multifunction printer or to authentication information stored in an authentication server connected to the multifunction printer via a network.

Furthermore, user authentication may be performed by using external authentication servers of solution providers providing web applications.

SUMMARY

The example embodiments of the present disclosure include a temporary authentication method in case of a failure in authentication using an external authentication server at an image forming apparatus.

Additional aspects will be set forth in part in the description which follows and, in part, will be apparent from the description, or may be learned by practice of the presented embodiments.

According to one or more embodiments of the present disclosure, a method of performing user authentication in an image forming apparatus, the method includes detecting an interruption or a failure occurring during authentication using an external authentication server; providing a user interface (UI) screen image for selecting to retry the authentication using the external authentication server or to enter a temporary authentication mode that does not use the external authentication server; when it is selected to enter the temporary authentication mode, entering an administrator authentication mode or an internal authentication mode based on pre-set temporary authentication options; and receiving information necessary for authentication and performing authentication based on a current authentication mode.

If entering the administrator authentication mode, a currently set authentication mode is changed to another authentication mode or user authentication is deactivated based on inputs of a user who is successfully authenticated as an administrator.

The authentication mode changed by the user who is successfully authenticated as an administrator is maintained even after the interruption or the failure is resolved.

The internal authentication mode is a local authentication mode or a network authentication mode.

If entering the local authentication mode, authentication is performed by comparing authentication information input by a user to authentication information stored in the image forming apparatus.

If entering the network authentication mode, authentication is performed by comparing authentication information input by a user to authentication information stored in an internal authentication server that is connected to the image forming apparatus via an intranet.

If entering the internal authentication mode, when the interruption or the failure is resolved, the authentication mode of the image forming apparatus is automatically changed to the authentication mode using the external authentication server.

If it is selected to retry the authentication using the external authentication server, it is determined whether the interruption or the failure is resolved, if the interruption or the failure is not resolved, the UI screen image for selecting to retry the authentication using the external authentication server or to enter a temporary authentication mode is displayed again, and, if the interruption or the failure is resolved, a UI screen image for performing the authentication using the external authentication server is displayed.

When the image forming apparatus enters the internal authentication mode and user authentication succeeds, some of functions of the image forming apparatus become available.

According to one or more embodiments of the present disclosure, an image forming apparatus includes a display unit, on which user interface (UI) screen images are displayed; a communication unit for performing communication with an external authentication server; a storage unit, in which temporary authentication options are stored; a control unit, which detects an interruption or a failure occurring during authentication using an external authentication server and entering a temporary authentication mode based on the stored temporary authentication options; and an image forming operation performing unit for performing an image forming operation, wherein, if an interruption or a failure occurs during the authentication using the external authentication server, the control unit displays a UI screen image for selecting to retry the authentication using the external authentication server or to enter a temporary authentication mode that does not use the external authentication server on the display unit, and, when it is selected to enter the temporary authentication mode, the control unit controls the image forming apparatus to enter an administrator authentication mode or an internal authentication mode based on pre-set temporary authentication options.

If entering the administrator authentication mode, the control unit changes a currently set authentication mode to another authentication mode or deactivates user authentication based on inputs of a user who is successfully authenticated as an administrator.

The control unit maintains the authentication mode changed by the user who is successfully authenticated as an administrator even after the interruption or the failure is resolved.

The internal authentication mode is a local authentication mode or a network authentication mode.

If entering the local authentication mode, the control unit performs authentication by comparing authentication information input by a user to authentication information stored in the image forming apparatus.

If entering the network authentication mode, the control unit performs authentication by comparing authentication information input by a user to authentication information stored in an internal authentication server that is connected to the image forming apparatus via an intranet.

If entering the internal authentication mode, when the interruption or the failure is resolved, the control unit automatically changes the authentication mode of the image forming apparatus to the authentication mode using the external authentication server.

If it is selected to retry the authentication using the external authentication server, the control unit determines whether the interruption or the failure is resolved, if the interruption or the failure is not resolved, the UI screen image for selecting to retry the authentication using the external authentication server or to enter a temporary authentication mode is displayed again, and, if the interruption or the failure is resolved, a UI screen image for performing the authentication using the external authentication server is displayed.

When the control unit enters the internal authentication mode and user authentication succeeds, some of functions of the image forming apparatus become available.

The pre-stored temporary authentication options may indicate a specific mode for temporary authorization when the interruption or failure has occurred during the authorization using the external authorization server, and may include at least the administrator authentication mode and the internal authentication mode. Further, the internal authentication mode may further include at least a local authentication mode and a network authentication mode.

According to one or more embodiments of the present disclosure, a system for performing user authentication may include: an image forming apparatus; and an external authentication server, wherein when a failure occurs during an authentication using the external authentication server, the image forming apparatus provides a user interface (UI) screen image for selecting to enter a temporary authentication mode that does not use the external authorization server, thereby allowing a user to use at least one function of the image forming apparatus via a temporary authorization.

BRIEF DESCRIPTION OF THE DRAWINGS

These and/or other aspects will become apparent and more readily appreciated from the following description of the embodiments, taken in conjunction with the accompanying drawings in which:

FIGS. 8 through 10 are flowcharts setting forth user authentication methods according to embodiments of the present disclosure.

DETAILED DESCRIPTION

Figure 1:
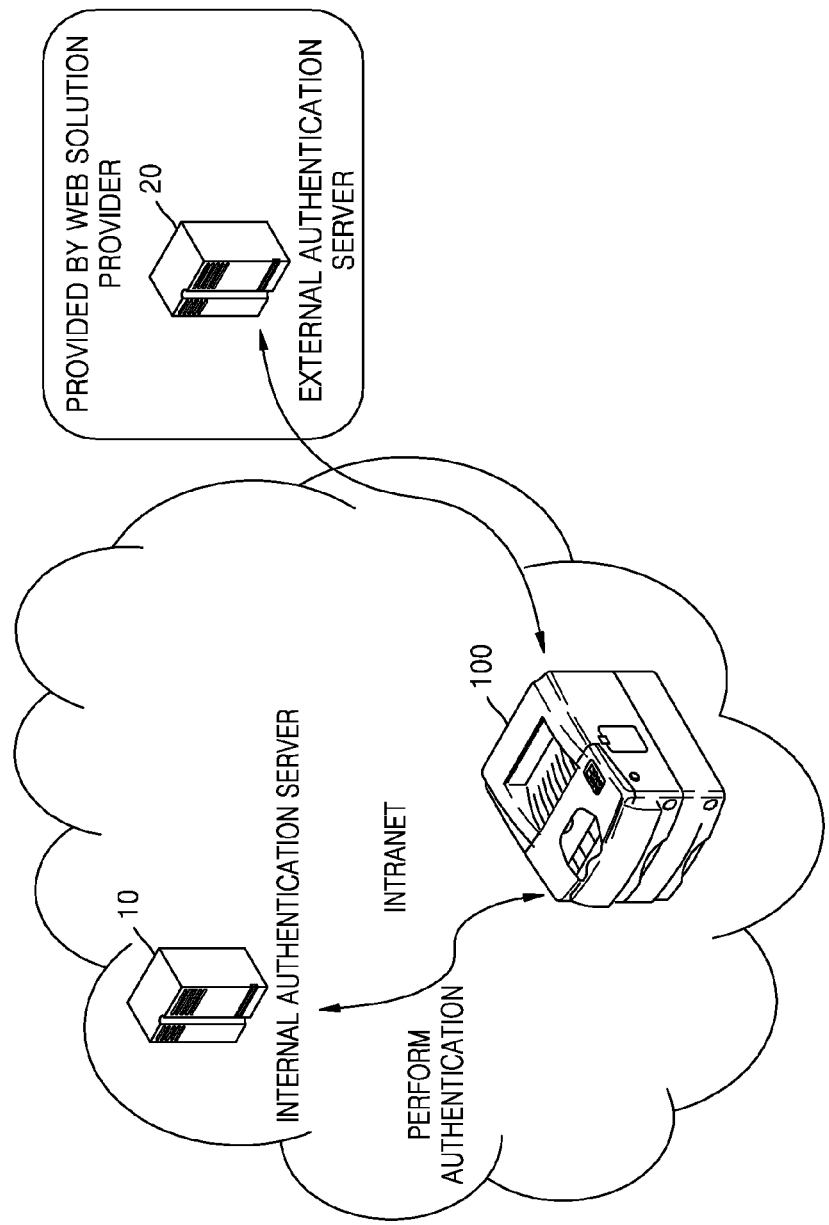
FIG. 1 is a diagram illustrating an environment for performing a user authentication method according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a diagram illustrating an environment for performing a user authentication method according to an embodiment of the present disclosure.

For maintaining security, a user may have to be authenticated in order to use functions of an image forming apparatus 100, and the user authentication may be performed in any of various ways. Referring to FIG. 1, user authentication may be performed by using an internal authentication server 10 connected to the image forming apparatus 100 via a company intranet or by using an external authentication server 20 provided by a web solution provider. Furthermore, user authentication may be performed by using a database arranged in the image forming apparatus 100. Here, for example, for the authentication using the external authentication server 20, a user arbitrarily selects a web solution provider for authentication, and thus, the authentication method will be referred to as a custom authentication.

For performing a user authentication, when a user checks a user interface (UI) screen image displayed at a display unit of the image forming apparatus 100 and inputs authentication information, such as a user ID and a password, the input authentication information is compared to authentication information stored in the external/internal authentication server or an internal database. If the input authentication information is identical to authentication information stored in the external/internal authentication server or the internal database, then it is considered that authentication is successful.

Therefore, to perform user authentication, communication with an external/internal authentication server is mandatory except in a case where user authentication is performed by using an internal database. Therefore, if a connection to a server fails, user authentication may not be performed.

Furthermore, in a case where there is a failure in a server, user authentication may not be performed as well.

However, in the related art, if a connection to an external authentication server is interrupted or if the external authorization server is unable to perform a custom authentication due to a failure in the external authentication server, a message indicating the interruption or the failure and an UI screen image displaying a button for selecting to retry the custom authentication are provided only.

In other words, if custom authentication fails due to an interrupted connection to the external authentication server 20 or a failure in the external authentication server 20, the only option available to a user is to retry the custom authentication, and thus the user is unable to use a function of the image forming apparatus 100 until the interruption or the failure is resolved. Of course, the user may temporarily use the image forming apparatus 100 by modifying an authentication mode by accessing the image forming apparatus 100 via a remote UI, such as a web UI. However, this method is inconvenient. Furthermore, if there is an interruption at a network connection of the image forming apparatus 100, it is unable to use the method.

To resolve such problems, in a user authentication method according to an embodiment of the present disclosure, if there is an interruption in a custom authentication, a button for selecting to retry a custom authentication and a button for entering a temporary authentication mode that does not use the external authentication server 20 are provided together in a UI screen image displayed at a web browser of the image forming apparatus 100.

For example, the temporary authentication mode may include an administrator authentication mode for performing an administrator authentication, a local authentication mode using a database in the image forming apparatus 100, and a network authentication mode using the internal authentication server 10 connected via an intranet. Furthermore, the local authentication mode and the network authentication mode may be referred to as internal authentication modes.

When a user selects the temporary authentication mode, a mode to enter from among the above-stated modes is determined based on pre-set temporary authentication options. Furthermore, particular modes to enter based on set temporary authentication options may be displayed at buttons provided in a UI screen image.

In the case of entering the administrator authentication mode, an administrator ID and a password are received from a user and an administrator authentication is performed. When the administrator authentication succeeds, the user may change an authentication mode or may deactivate an authentication mode. In other words, the user may change an authentication mode from a currently set custom authentication mode to the local authentication mode or the network authentication mode, which do not use the external authentication server 20. Next, when the authentication mode is changed, user authentication may be performed according to the changed authentication mode and function of the image forming apparatus 100 may be performed.

Meanwhile, an authentication mode that is changed by a user after an administrator authentication succeeds is maintained even when an interruption in a custom authentication mode is resolved, and thus it is necessary to change an authentication mode to use the custom authentication mode again.

In the case of entering an internal authentication mode, the image forming apparatus 100 enters immediately the local authentication mode or the network authentication mode based on pre-set temporary authentication options and a user authentication is performed. In the local authentication mode, authentication information, such as a user ID and a password, is received from a user, and user authentication is performed by comparing the received authentication information to authentication information stored in a database of the image forming apparatus 100. In the network authentication mode, authentication information, such as a user ID and a password, is received from a user, and user authentication is performed by comparing the received authentication information to authentication information stored in the internal authentication server 10.

Meanwhile, depending on embodiments, the custom authentication mode may be automatically switched to from the internal authentication mode when an interruption or a failure in a custom authentication is resolved. Therefore, the custom authentication mode may be set as the default mode.

Further, in a case where the user authentication is performed in an internal authentication mode, some functions of the image forming apparatus 100 that require the custom authentication may not be used or available for use by the user. To use such functions, a user may wait until an interruption or a failure is resolved, so that the user authentication may be performed in a custom authentication mode. However, the problem in the related art that even basic functions of the image forming apparatus 100 may not be used when an interruption or a failure occurs in a custom authentication may be resolved according to embodiments of the present disclosure.

Detailed descriptions of a user authentication method according to an embodiment of the present disclosure will be given below with reference to an UI screen image.

Figure 2:
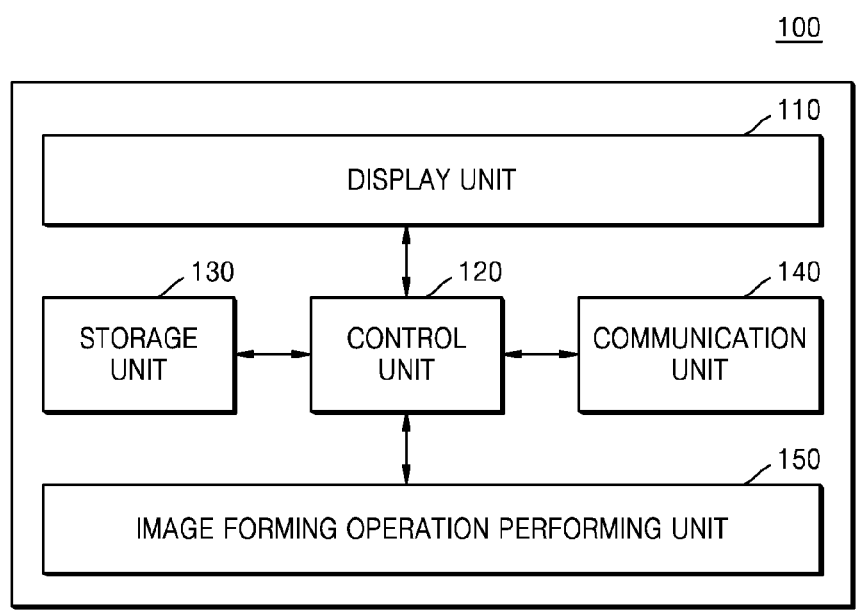
FIG. 2 is a diagram illustrating an exemplary hardware configuration of the image forming apparatus according to an embodiment of the present disclosure.

FIG. 2 is a diagram illustrating an example hardware configuration of the image forming apparatus 100 according to an embodiment of the present disclosure. Referring to FIG. 2, the image forming apparatus 100 may include a display unit 110, a control unit 120, a storage unit 130, a communication unit 140, and an image forming operation performing unit 150.

For example, a UI screen image may be displayed at the display unit 110. UI screen images displayed at the display unit 110 during a user authentication according to an embodiment of the present disclosure are shown in FIGS. 3 through 7C. The UI screen images displayed at the display unit 110 illustrated in FIGS. 3-7C are examples, and thus, the present disclosure is not limited to the layout of the UI screen images illustrated in the drawings. Further, the display unit 110 may also be embodied as a touch screen capable of receiving touch inputs.

The control unit 120 controls operations of all of the components of the image forming apparatus 100. Particularly, in terms of performing a user authentication method according to an embodiment of the present disclosure, the control unit 120 may determine whether an interruption occurs during a custom authentication using an external authentication server and may display a UI screen image for selecting a temporary authentication mode at the display unit 110 based on a result of the determination. That is, as an example, if an error occurs during the custom authentication, then the displayed UI screen image may present a user with the option for using the temporary authentication mode.

Furthermore, the control unit 120 may store temporary authentication options in the storage unit 130 or may determine a particular temporary authentication mode to enter based on temporary authentication options stored in the storage unit 130. The control unit 120 may transmit and receive data for user authentication via the communication unit 140 and may also control the image forming operation performing unit 150 to perform an image forming operation according to an instruction from a user.

Temporary authentication options may be stored in the storage unit 130. The temporary authentication options are pre-set options indicating a specific method for performing a temporary authentication in case of an interruption in a custom authentication. In other words, temporary authentication options are options specifying a mode to enter, and include at least an administrator authentication mode or an internal authentication mode. In the case of entering the internal authentication mode, a mode to enter may include a local authentication mode or a network authentication mode, when an interruption occurs during a custom authentication. When an interruption occurs in a custom authentication, the control unit 120 checks temporary authentication options stored in the storage unit 130 and may determine a temporary authentication mode to enter. Meanwhile, other than temporary authentication options, print data, such as various images and documents, or data for driving the image forming apparatus 100 may be stored in the storage unit 130.

The communication unit 140 is a component for performing communications with other devices or servers. The image forming apparatus 100 may transmit and receive data for user authentication to and from the internal authentication server 10 or the external authentication server 20 via the communication unit 140.

The image forming operation performing unit 150 performs an image forming operation, such as printing, copying, or scanning, according to an instruction of a user.

Hereinafter, detailed descriptions of a user authentication method and setting of temporary authentication options according to an embodiment of the present disclosure will be given with reference to FIGS. 1 and 2 and UI screen images shown in FIGS. 3 through 7C. The UI screen images of FIGS. 3-7C are exemplary, and thus, the present disclosure is not limited to the layout illustrated in FIGS. 3-7C.

Figure 3:
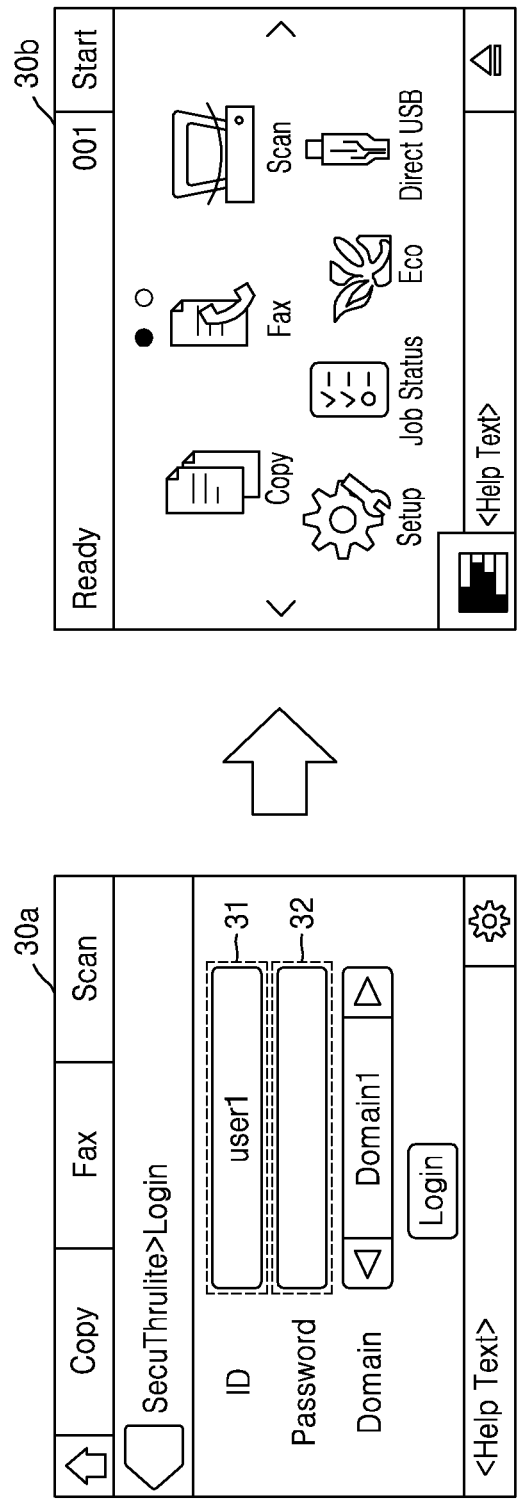
FIG. 3 is a diagram illustrating exemplary UI screen images displayed in the case where a custom authentication succeeds in a user authentication method according to an embodiment of the present disclosure.

FIG. 3 is a diagram illustrating example UI screen images displayed in the case where a custom authentication succeeds in a user authentication method according to an embodiment of the present disclosure.

A first UI screen image 30a shown in FIG. 3 is a UI screen image for receiving inputs of a user ID and a password for performing a custom authentication. When a user inputs a user ID via an ID input box 31 and inputs a password via a password input box 32, the control unit 120 transmits the user ID and the password to the external authentication server 20 via the communication unit 140 and requests user authentication. The external authentication server 20 compares stored authentication information to received authentication information, and, if the stored authentication information is identical to the received authentication information, transmits a message indicating that the user authentication is successful to the image forming apparatus 100. The control unit 120 confirms the user authentication success message received via the communication unit 140, determines that the user authentication was successful, and displays a home screen image, such as the second UI screen image 30b, at the display unit 110. The user may select a desired function in the home screen image and use the image forming apparatus 100 for the desired function.

Figure 4:
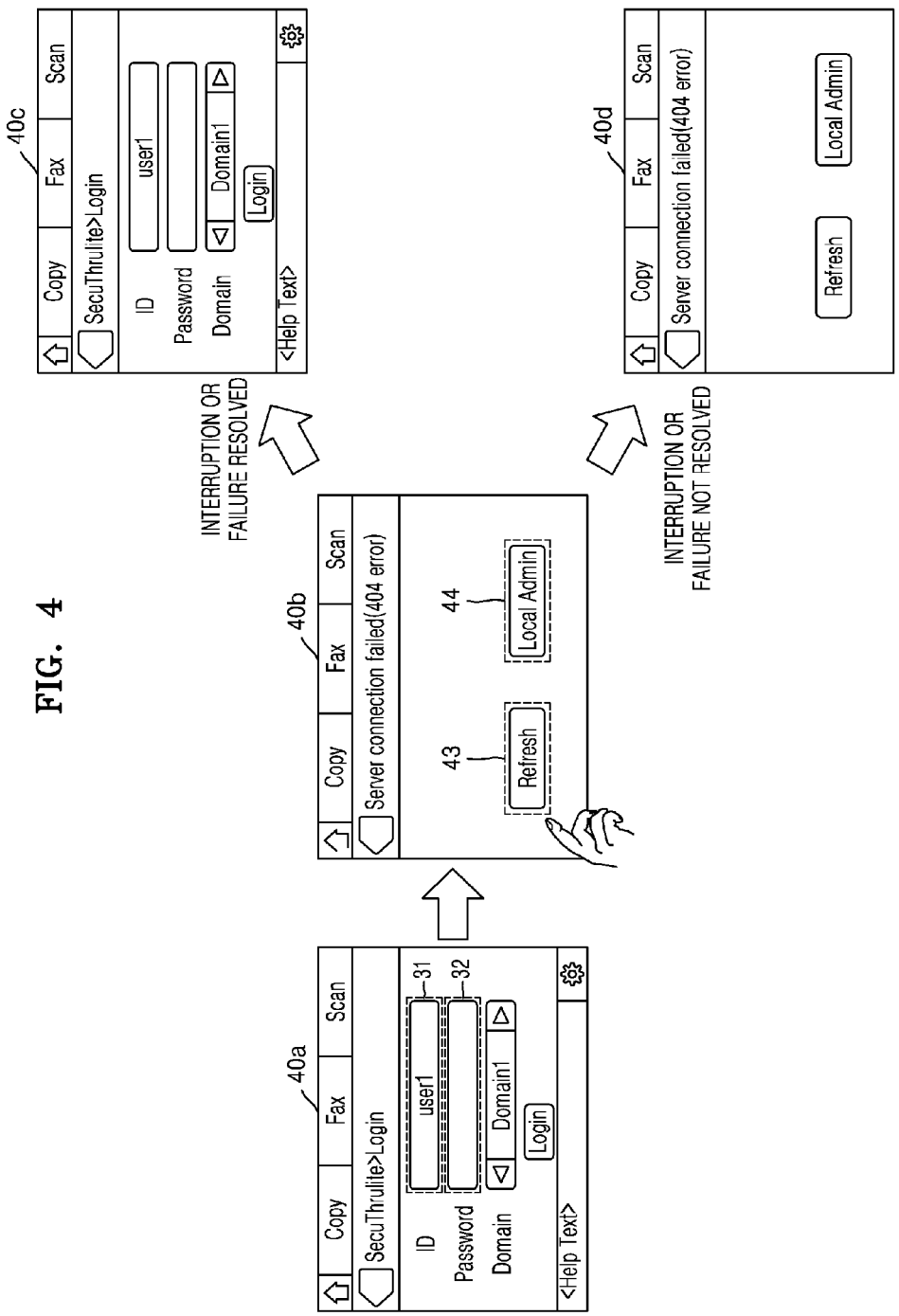
FIG. 4 is a diagram illustrating exemplary UI screen images displayed based on whether an interruption is resolved in the case where the interruption occurs in a custom authentication and it is selected to retry the custom authentication in a user authentication method according to an embodiment of the present disclosure.

FIG. 4 is a diagram illustrating UI screen images displayed based on whether an interruption is resolved in the case where the interruption occurs during a custom authentication and it is selected to retry the custom authentication in a user authentication method according to an embodiment of the present disclosure.

Referring to FIG. 4, when a user ID and a password are received via a first UI screen image 40a for a custom authentication and a connection to the external authentication server 20 is interrupted or custom authentication is unable to be performed due to a failure at the external authentication server 20, a second UI screen image 40b is displayed. In the second UI screen image 40b, a message "server connection failed (404 error)," which informs that a problem has occurred at a connection to a server, is displayed.

Here, for example, the second UI screen image 40b is displayed only when it is unable to perform a custom authentication due to an interruption of connection or a failure of a server. If user authentication fails due to mismatch of a user ID or a password, a message informing failure of a user authentication due to mismatch of authentication information and a UI screen image for re-entering authentication information will be displayed instead of the second UI screen image 40b.

As shown in FIG. 4, a retry button 43 for retrying a custom authentication and a temporary authentication select button 44 for entering a temporary authentication mode are displayed in the second UI screen image 40b. According to the present embodiment, the temporary authentication select button 44 is provided as a button to enter an administrator authentication mode under an assumption that temporary authentication options are set to select the administrator authentication mode from among temporary authentication modes.

When a user selects the retry button 43 in the second UI screen image 40b, the control unit 120 of the image forming apparatus 100 determines whether a custom authentication may be performed again, that is, whether an interruption or a failure is resolved. If it is determined that the interruption or the failure is resolved, a third-first UI screen image 40c is displayed at the display unit 110. If the interruption or the failure is not yet resolved, a third-second UI screen image 40d is displayed. Here, for example, the third-first UI screen image 40c is a UI screen image for performing a custom authentication and is similar or identical to the first UI screen image 40a. Furthermore, the third-second UI screen image 40d is a UI screen image for selecting to retry or to enter a temporary authentication mode and is similar or identical to the second UI screen image 40b.

Figure 5:
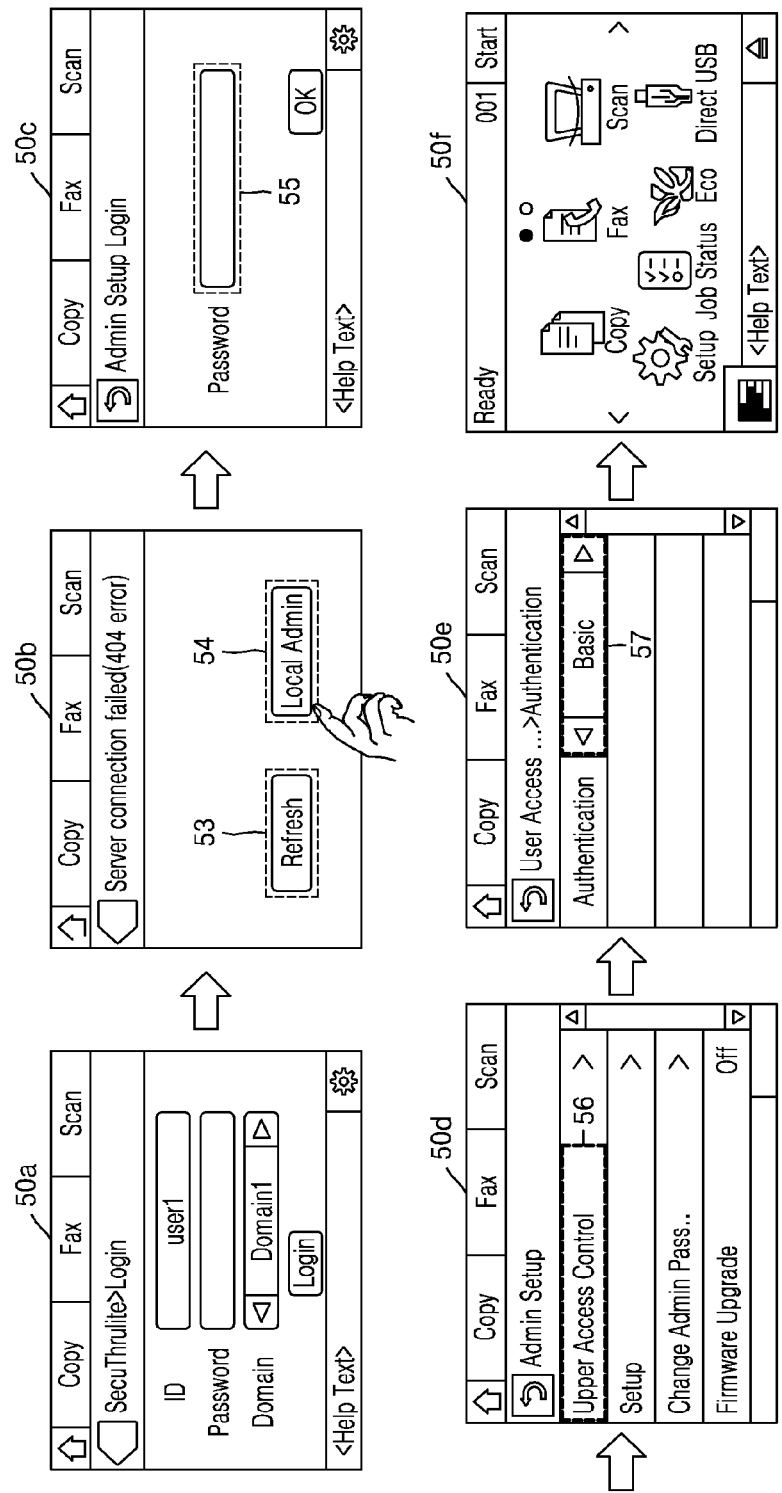
FIG. 5 is a diagram illustrating exemplary UI screen images displayed when a temporary authentication mode is selected and an administrator authentication is performed in a user authentication method according to an embodiment of the present disclosure.

FIG. 5 is a diagram illustrating example UI screen images displayed when a temporary authentication mode is selected (i.e., when the temporary authentication select button 44 is selected) and an administrator authentication is performed in a user authentication method according to an embodiment of the present disclosure.

Referring to FIG. 5, if an interruption or a failure occurs during a custom authentication performed with a user ID and a password that are input in a first UI screen image 50a by a user, a second UI screen image 50b is displayed. As described above with reference to FIG. 4, the second UI screen image 50b is displayed only when it is unable to perform the custom authentication due to an interruption in a connection or a failure at a server.

When the user selects a temporary authentication select button 54 in the second UI screen image 50b, the image forming apparatus 100 enters an administrator authentication mode and a third UI screen image 50c is displayed. In the third UI screen image 50c, an administrator password input box 55 is displayed. When the user enters a password in the administrator password input box 55 and selects an OK button, the control unit 120 determines whether the input password is identical to an administrator password. If it is determined that the input password is identical to the administrator password, the administrator authentication succeeds, and a fourth UI screen image 50d is displayed.

In the fourth UI screen image 50d, menus that may be operated in an administrator mode are displayed. From among the menus, for example, when a menu "user access control" 56 regarding settings related to authentication modes is selected, a fifth UI screen image 50e is displayed. In the fifth UI screen image 50e, an authentication mode setting change box 57 is displayed. A user may change a custom authentication mode to one from between a local authentication mode or a network authentication mode. Alternatively, the user may change a setting to deactivate user authentication via the authentication mode setting change box 57. If a setting is changed to not to use an authentication mode, a sixth UI screen image 50f is displayed. The user may select a desired function in the sixth UI screen image 50f and use the image forming apparatus 100.

Meanwhile, an authentication mode changed by a user after an administrator authentication succeeds is maintained even when an interruption in a custom authentication mode is resolved, and thus, a user may change an authentication mode back to the custom authentication mode to use the custom authentication mode again.

As described above, when an interruption or a failure occurs in a custom authentication, an administrator authentication may be performed and an authentication mode may be changed, and thus a user may use the image forming apparatus 100 even before the interruption or the failure in the custom authentication is resolved.

Figure 6:
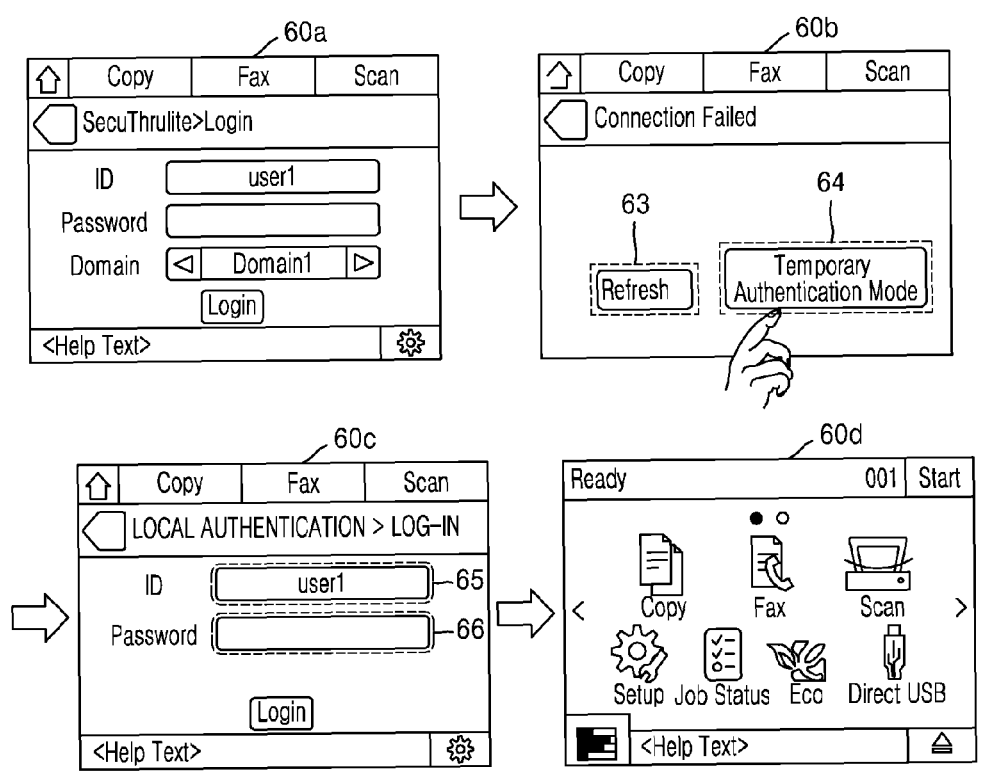
FIG. 6 is a diagram illustrating exemplary UI screen images displayed when a temporary authentication mode is selected and an internal authentication is performed in a user authentication method according to an embodiment of the present disclosure.

FIG. 6 is a diagram illustrating example UI screen images displayed when a temporary authentication mode is selected and an internal authentication is performed in a user authentication method according to an embodiment of the present disclosure.

Referring to FIG. 6, if an interruption or a failure occurs in a custom authentication performed with a user ID and a password that are input in a first UI screen image 60a by a user, a second UI screen image 60b is displayed. As described above with reference to FIG. 4, the second UI screen image 60b is displayed only when it is unable to perform the custom authentication due to an interruption in a connection or a failure at a server.

When the user selects a temporary authentication select button 64 in the second UI screen image 60b, the image forming apparatus 100 enters an administrator authentication mode and a third UI screen image 60c is displayed. In the present embodiment, the image forming apparatus 100 entered a local authentication mode from between internal authentication modes.

In the third UI screen image 60c, a user ID input box 65 and a password input box 66 for performing a local authentication are displayed. When the user enters a user ID and a password in the boxes 65 and 66 and selects a log-in button, the control unit 120 determines whether the input user ID and the input password are identical to a user ID and a password stored in the storage unit 130. If it is determined that the input user ID and the input password are identical to the user ID and the password stored in the storage unit 130, it is considered that the user authentication succeeded, and a fourth UI screen image 60d is displayed at the display unit 110.

When an internal authentication succeeds as described above, a user may use all of functions of the image forming apparatus 100 except some functions of the image forming apparatus 100 that requires a custom authentication.

Meanwhile, although a case in which a local authentication mode from between internal authentication modes is used is described in the present embodiment, a network authentication mode may also be used. Here, for example, UI screen images that are displayed in the case of using the network authentication mode are similar or identical to those UI screen images displayed in the present embodiment, wherein the UI screen images displayed in the network authentication mode show that a current authentication mode is the network authentication mode. Furthermore, an input user ID and an input password are compared to authentication information stored in the internal authentication server 10 connected via an intranet.

Meanwhile, depending on embodiments, it may be set to be automatically switched to the custom authentication mode from the internal authentication mode when an interruption or a failure in a custom authentication is resolved. Therefore, the custom authentication mode may be set as the default mode.

Figure 7A:
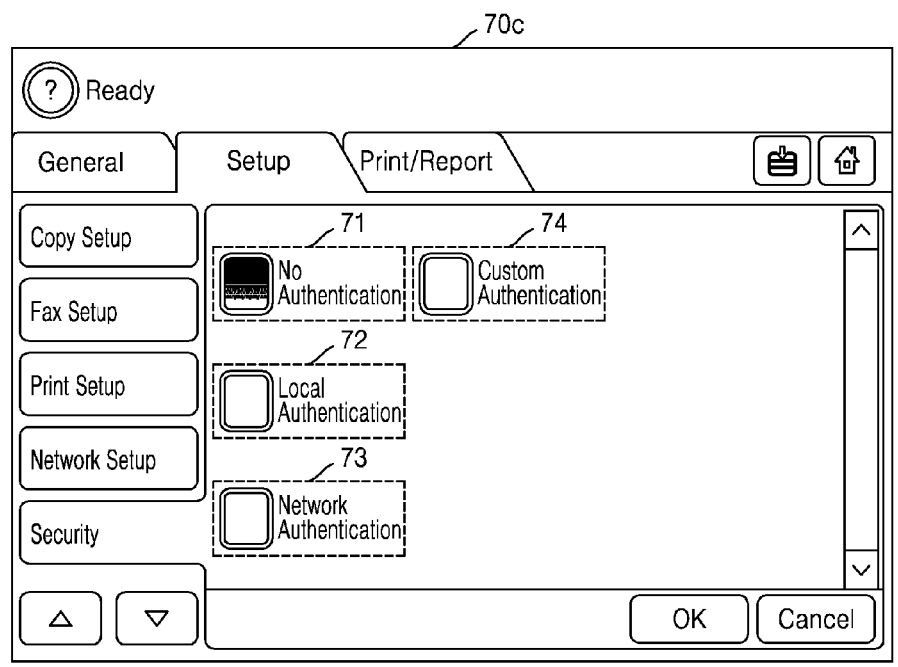
FIGS. 7A through 7C are diagrams illustrating exemplary UI screen images for setting temporary authentication options for selecting a custom authentication mode in a user authentication method according to an embodiment of the present disclosure.
Figure 7B:
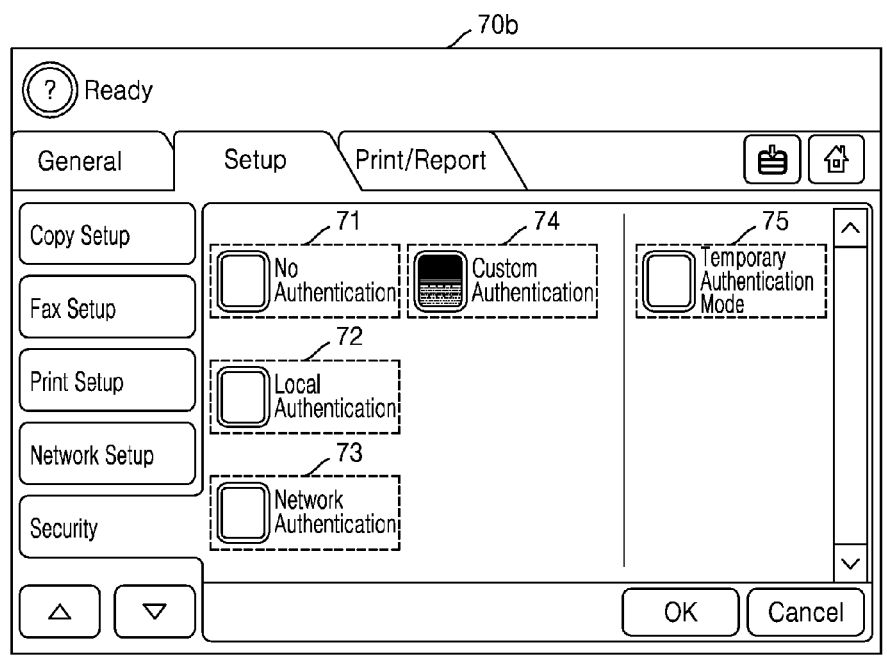
Figure 7C:
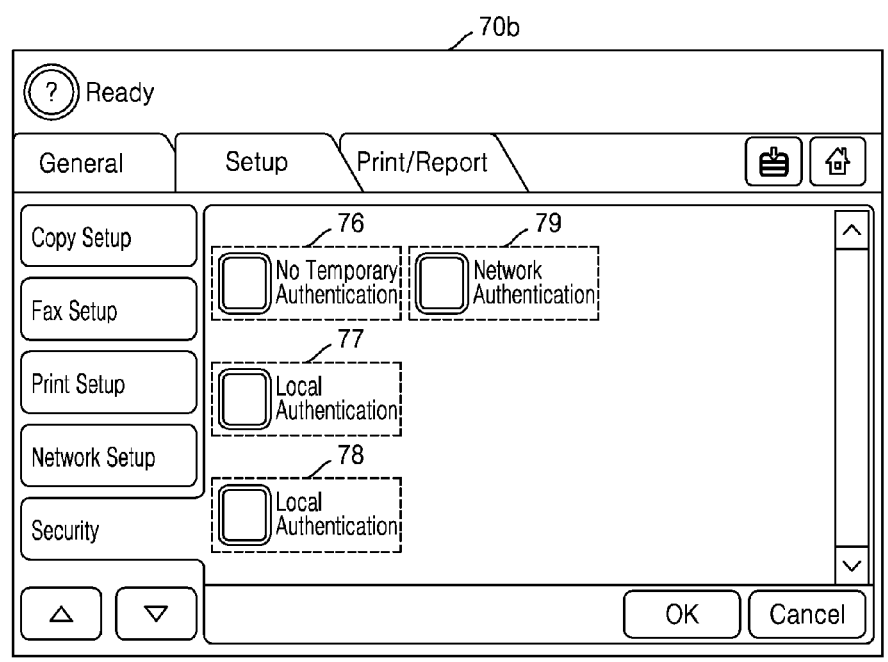

FIGS. 7A through 7C are diagrams showing UI screen images for setting temporary authentication options for selecting a custom authentication mode in a user authentication method according to an embodiment of the present disclosure.

Referring to FIG. 7A, a security menu of a setup tab of a first UI screen image 70a includes checkboxes respectively corresponding to a no authentication 71, a local authentication 72, a network authentication 73, and a custom authentication 74.

In a first UI screen image 70a, when a checkbox corresponding to the no authentication 71 is selected, the image forming apparatus 100 is set to be used without a user authentication. Furthermore, if a checkbox corresponding to the local authentication 72 or the network authentication 73 is selected, the image forming apparatus 100 is set to perform a user authentication in a local authentication mode or a network authentication mode, respectively. When a checkbox corresponding to the custom authentication 74 is selected, the image forming apparatus 100 is set to perform a user authentication in a custom authentication.

Meanwhile, referring to FIG. 7B, when a checkbox corresponding to the custom authentication 74 is selected, a checkbox corresponding to a temporary authentication mode 75 for setting options regarding a temporary authentication mode to be used in case where an interruption or a failure occurs in a custom authentication is displayed in the second UI screen image 70b. When a checkbox corresponding to the temporary authentication mode 75 is selected, a third UI screen image 70c for setting specific temporary authentication options is displayed as shown in FIG. 7C.

Referring to FIG. 7C, checkboxes corresponding to respective temporary authentication options including no temporary authentication 76, administrator authentication mode (local admin only) 77, local authentication mode 78, and network authentication mode 79 are displayed.

When a checkbox corresponding to no temporary authentication 76 is selected in the third UI screen image 70c, it is set to not to use a temporary authentication mode even if an interruption or a failure occurs in a custom authentication. Therefore, a notification message indicating that an interruption or a failure has occurred in the custom authentication and only a button to select to retry the custom authentication are displayed in a UI screen image.

When a checkbox corresponding to administrator authentication mode (local admin only) 77 is selected, an administrator authentication mode is provided as a temporary authentication mode in the case where an interruption or a failure occurs in a custom authentication. In other words, a button to select to retry the custom authentication and a button to select to enter the administrator authentication mode are provided in a UI screen image. The UI screen image is as shown in FIG. 5.

When a checkbox corresponding to local authentication mode 78 or a checkbox corresponding to network authentication mode 79 is selected, a local authentication mode or a network authentication mode is provided in case where an interruption or a failure occurs in a custom authentication. In other words, a button to select to retry the custom authentication and a button to select to enter the local authentication mode or the network authentication mode are provided in a UI screen image. The UI screen image is as shown in FIG. 6. The UI screen image shown in FIG. 6 is an example, and thus, the present disclosure is not limited thereto.

Temporary authentication options set via the UI screen images as shown in FIGS. 7A through 7C as described above are stored in the storage unit 130 of the image forming apparatus 100. Next, if an interruption or a failure occurs in a custom authentication, the control unit 120 checks temporary authentication options stored in the storage unit 130 and determines a particular temporary authentication mode to use, based on a result of the checking.

Figure 8:
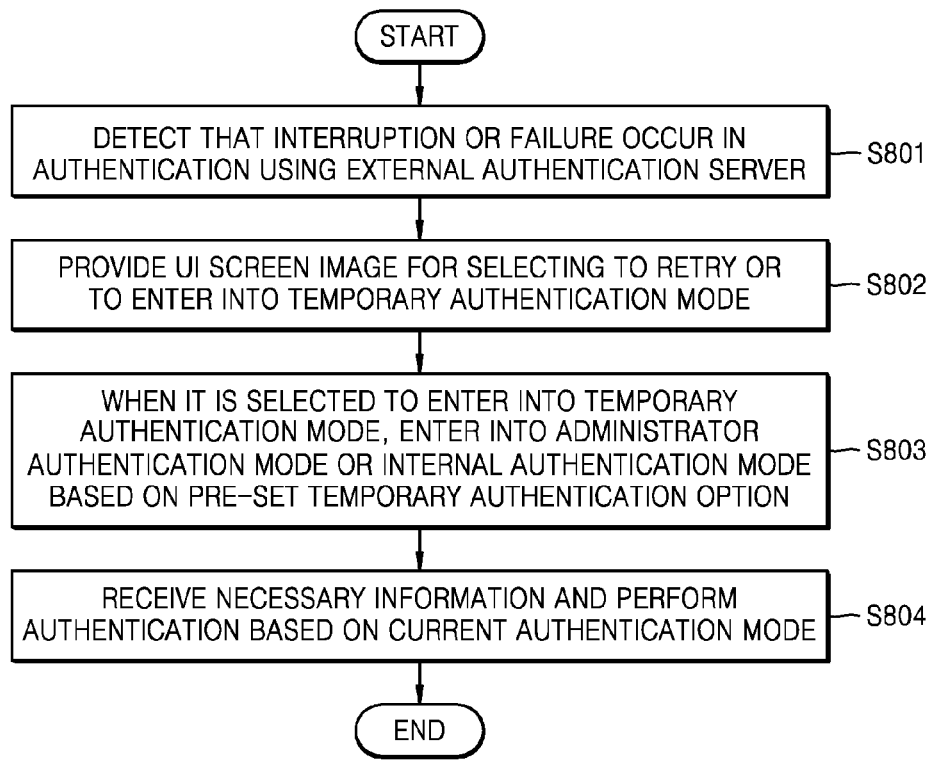

FIGS. 8 through 10 are flowcharts setting forth user authentication methods according to example embodiments of the present disclosure.

Referring to FIG. 8, in an operation S801, when an image forming apparatus detects that an interruption or a failure occurs in a custom authentication using a external authentication server, a UI screen image for receiving an input for selecting whether to retry the custom authentication or to enter a temporary authentication mode is provided to a display unit of the image forming apparatus in an operation S802. A message indicating that an interruption or a failure has occurred during a custom authentication may also be displayed in the UI screen image.

When it is selected to enter a temporary authentication mode via the UI screen image provided in the operation S802, the image forming apparatus enters an administrator authentication mode or an internal authentication mode based on pre-set temporary authentication options in an operation S803. The temporary authentication options may be set to make the image forming apparatus enter a particular temporary authentication mode in the case where an interruption or a failure occurs during a custom authentication and may be stored in the storage unit 130 in advance.

In an operation S804, according to a current temporary authentication mode, information necessary for authentication is received and authentication is performed. In other words, if the current temporary authentication mode entered in the operation S803 is an administrator authentication mode, an administrator password is received and it is determined whether the input administrator password is identical to an administrator password stored in advance. Furthermore, if the current temporary authentication mode entered in the operation S803 is a local authentication mode or a network authentication mode, a user ID and a password are received and it is determined whether the user ID and the password are identical to authentication information stored in a database of a image forming apparatus or authentication information stored in an internal authentication server connected via an intranet.

Referring to FIG. 9, when it is detected in an operation S901 that an interruption or a failure occurs in a custom authentication using a external authentication server, a UI screen image for selecting to retry the custom authentication or to enter a temporary authentication mode is provided to the display unit of the image forming apparatus in an operation S902. In the UI screen image, a message indicating that an interruption or a failure has occurred in a custom authentication may also be displayed.

In an operation S903, when the button to enter the temporary authentication mode is selected in the UI screen image provided in the operation S902, pre-set temporary authentication options are checked. In an operation S904, it is determined whether the temporary authentication options are set to enter an administrator authentication mode, and, if the temporary authentication options are set to enter the administrator authentication mode, the method proceeds to an operation S905 and a user ID and a password are input. In an operation S906, when an administrator authentication succeeds, a currently set custom authentication mode may be changed to another authentication mode or user authentication may be deactivated based on user inputs.

If it is determined that the temporary authentication options are not set to enter the administrator authentication mode, the method proceeds to an operation S907 and it is determined whether the temporary authentication options are set to enter an internal authentication mode. If it is determined that the temporary authentication options are set to enter an internal authentication mode, the method proceeds to an operation S908 and a user ID and a password are input. In an operation S909, when user authentication succeeds, functions of the image forming apparatus except functions requiring custom authentication may be used.

Referring to FIG. 10, if it is detected in an operation S1001 that an interruption or a failure occurs in a custom authentication using an external authentication server, a UI screen image for selecting to retry the custom authentication or to enter a temporary authentication mode is provided to the display unit of the image forming apparatus in an operation S1002. In the UI screen image, a message indicating that an interruption or a failure has occurred in a custom authentication may also be displayed.

In an operation 1003, it is determined whether the button to enter the temporary authentication mode is selected in the UI screen image provided in the operation S1002. If the button to enter the temporary authentication mode is selected, the method proceeds to an operation S1004. If the button to enter the temporary authentication mode is not selected, the method proceeds to an operation S1006.

In an operation S1004, the image forming apparatus enters an administrator authentication mode or an internal authentication mode based on pre-set temporary authentication options. Next, in an operation S1005, authentication information is received and user authentication is performed, based on a current temporary authentication mode.

Meanwhile, in an operation S1006, it is determined whether the button to retry the custom authentication is selected in the UI screen image provided in the operation S1002. If it is determined that the button to retry the custom authentication is selected, the method proceeds to an operation S1007 and it is determined whether an interruption or a failure that has occurred in a custom authentication is resolved. If the interruption or the failure occurring in a custom authentication is resolved, the method proceeds to an operation S1008 and a UI screen image for performing the custom authentication is provided. However, if the interruption or the failure occurring in a custom authentication is not resolved, the method proceeds back to the operation S1002 and a UI screen image for selecting to retry the custom authentication or to enter a temporary authentication mode is provided.

Finally, in an operation S1009, authentication information for performing the custom authentication, which includes a user ID and a password, is received and the custom authentication is performed.

As described above, according to the one or more of the above embodiments of the present disclosure, when an interruption or a failure occurs in a custom authentication using an external authentication server, a temporary authentication mode, which does not use the external authentication server, is provided based on pre-set temporary authentication options, and thus a user does not have to wait until the an interruption or the failure is resolved and may use functions of an image forming apparatus via a temporary authentication.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A method of performing user authentication in an image forming apparatus, the method comprising:
   detecting, by way of a processor, whether an interruption or a failure has occurred during authentication using an external authentication server that is connected to the image forming apparatus using Internet;
   providing a user interface (UI) to receive a selection by a user of a temporary authentication mode that does not use the external authentication server;
   when the temporary authentication mode is selected by the user, entering a network authentication mode, as the current authentication mode, which connects to an internal authentication server using intranet on a local network; and
   receiving information, from the internet authentication server, for the user authentication and performing the user authentication based on the received information of the current authentication mode.

2. The method of claim 1, wherein, the current authentication mode is changed to a second authentication mode or the user authentication is deactivated based on an input of the user who is successfully authenticated as an administrator.

3. The method of claim 2, wherein the second authentication mode is maintained even after the interruption or the failure is resolved.

4. The method of claim 1, wherein, when entering the network authentication mode, authentication is performed by comparing authentication information input by the user to authentication information stored in the internal authentication server that is connected to the image forming apparatus via the intranet.

5. The method of claim 1, wherein, when the interruption or the failure is resolved, the current authentication mode of the image forming apparatus is automatically changed to use the external authentication server.

6. The method of claim 1, wherein, when it is selected to retry the user authentication using the external authentication server, it is determined whether the interruption or the failure is resolved, and:

when the interruption or the failure is not resolved, the UI to allow the selection of the temporary authentication mode is displayed again, and, when the interruption or the failure is resolved, a second UI screen image for performing the user authentication using the external authentication server is displayed.

7. The method of claim 1, wherein, when the network authentication mode is the current authentication mode and the user authentication succeeds, at least one function of the image forming apparatus becomes available.

8. A non-transitory computer readable recording medium having recorded thereon a computer program for implementing the method of claim 1.

9. The method of claim 1,
   wherein when the temporary authentication mode is selected by the user, another UI including an administrator password input box is provided to receive an administrator password from the user, and
   wherein the administrator password is transmitted to the internal authentication server using the intranet and the internal authentication server performs the user authentication based on the transmitted administrator password.

10. An image forming apparatus comprising:
    a display, on which user interface (UI) is displayed;
    a communicator to perform communication with an external authentication server and an internal authentication server;
    a memory, in which temporary authentication options are stored;
    a controller, which detects an interruption or a failure occurring during authentication using an external authentication server, which is connected to the image forming apparatus using Internet which is an external network, and enters a temporary authentication mode based on the stored temporary authentication options; and
    an image forming operation performing unit for performing an image forming operation,
    wherein, when an interruption or a failure occurs during the authentication using the external authentication server, the controller displays a UI to receive a selection by a user of a temporary authentication mode as a current authentication mode that does not use the external authentication server, and
    when the temporary authentication mode is selected by the user, the controller controls the image forming apparatus to enter a network authentication mode, as the current authentication mode, which connects the communicator and the internal authentication server using intranet on an internal network.

11. The image forming apparatus of claim 10, wherein, the controller changes the current authentication mode to a second authentication mode or deactivates user authentication based on an input of the user who is successfully authenticated as an administrator.

12. The image forming apparatus of claim 11, wherein the controller maintains the second authentication mode even after the interruption or the failure is resolved.

13. The image forming apparatus of claim 10, wherein, when entering the network authentication mode, the controller performs authentication by comparing authentication information input by the user to authentication information stored in an internal authentication server that is connected to the image forming apparatus via the intranet.

14. The image forming apparatus of claim 10, wherein, when the interruption or the failure is resolved, the controller automatically changes the current authentication mode of the image forming apparatus to use the external authentication server.

15. The image forming apparatus of claim 10, wherein, when it is selected to retry the user authentication using the external authentication server, the controller determines whether interruption or the failure is resolved, and:

when the interruption or the failure is resolved, the UI screen image for selecting to retry the authentication using the external authentication server or to enter a temporary authentication mode is displayed on the display again, and, when the interruption or the failure is resolved, a UI screen image for performing the authentication using the external authentication server is displayed.

16. The image forming apparatus of claim 10, wherein, when the network authentication mode is the current authentication mode and user authentication succeeds, at least one function of the image forming apparatus becomes available.

17. A system for performing user authentication, the system comprising:

an image forming apparatus;

an internal authentication server connected to the image forming apparatus using intranet on an internal network; and an external authentication server connected to the image forming apparatus using Internet which is an external network, wherein when a failure occurs during the authentication using the external authentication server, the image forming apparatus provides a user interface (UI) to receive a selection of a network authentication mode that does not use the external authorization server, thereby allowing a user to use at least one function of the image forming apparatus via a temporary authorization that is obtained from the internal authentication server using the intranet on the internal network.

\* \* \* \* \*